United States Patent
Lu et al.

(10) Patent No.: US 11,671,805 B2
(45) Date of Patent: Jun. 6, 2023

(54) METHOD AND APPARATUS FOR IMPROVING WIRELESS COMMUNICATION PERFORMANCE UNDER COEXISTENCE OF MULTIPLE WIRELESS COMMUNICATION SYSTEMS IN SAME ELECTRONIC DEVICE

(71) Applicant: MEDIATEK INC., Hsin-Chu (TW)

(72) Inventors: Yen-Shuo Lu, Hsinchu (TW); Ting-Che Tseng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/161,693

(22) Filed: Jan. 29, 2021

(65) Prior Publication Data

US 2021/0400454 A1  Dec. 23, 2021

Related U.S. Application Data

(60) Provisional application No. 63/041,167, filed on Jun. 19, 2020.

(51) Int. Cl.
| | |
|---|---|
| *H04W 4/80* | (2018.01) |
| *H04W 76/14* | (2018.01) |
| *H04W 84/12* | (2009.01) |
| *H04L 1/00* | (2006.01) |
| *H04W 72/04* | (2023.01) |
| *H04L 5/00* | (2006.01) |
| *H04W 92/18* | (2009.01) |

(52) U.S. Cl.
CPC ............. *H04W 4/80* (2018.02); *H04L 1/0003* (2013.01); *H04L 5/0007* (2013.01); *H04W 72/0406* (2013.01); *H04W 76/14* (2018.02); *H04W 84/12* (2013.01); *H04W 92/18* (2013.01)

(58) Field of Classification Search
CPC ... H04W 4/80; H04W 72/04; H04W 72/0406; H04W 84/12; H04W 76/14; H04W 92/18; H04L 1/00; H04L 5/00; H04L 1/0003; H04L 5/0007
See application file for complete search history.

(56) References Cited

U.S. PATENT DOCUMENTS

| | | | |
|---|---|---|---|
| 11,228,408 B2 * | 1/2022 | Matsuo | H04B 7/0452 |
| 2015/0085841 A1 * | 3/2015 | Sadek | H04J 3/16 |
| | | | 370/336 |
| 2016/0157162 A1 * | 6/2016 | Batta | H04W 36/08 |
| | | | 455/432.1 |
| 2018/0110076 A1 * | 4/2018 | Ko | H04W 28/04 |

* cited by examiner

*Primary Examiner* — Tuan H Nguyen
(74) *Attorney, Agent, or Firm* — Winston Hsu

(57) ABSTRACT

A wireless communication method includes: obtaining operational information of a first wireless communication system; in response to the operational information of the first wireless communication system, adjusting a wireless communication configuration of a second wireless communication system to set an adjusted wireless communication configuration for the second wireless communication system; and performing, by the second wireless communication system, wireless communication under the adjusted wireless communication configuration. The first wireless communication system and the second wireless communication system co-exist in a same electronic device.

18 Claims, 11 Drawing Sheets

(A)

(B)

(C)

(A)

(B)

METHOD AND APPARATUS FOR IMPROVING WIRELESS COMMUNICATION PERFORMANCE UNDER COEXISTENCE OF MULTIPLE WIRELESS COMMUNICATION SYSTEMS IN SAME ELECTRONIC DEVICE

CROSS REFERENCE TO RELATED APPLICATIONS

This application claims the benefit of U.S. provisional application No. 63/041,167, filed on Jun. 19, 2020 and incorporated herein by reference.

BACKGROUND

The present invention relates to wireless communications, and more particularly, to a method and apparatus for improving wireless communication performance under coexistence of multiple wireless communication systems in a same electronic device.

Industrial, scientific and medical (ISM) radio bands are radio bands reserved internationally for the use of radio-frequency (RF) energy for industrial, scientific and medical purposes other than telecommunications. In the field of wireless communications, the ISM band of 2.4 GHz is often used by different wireless technology standards, e.g. Bluetooth (BT) standard and Wireless Fidelity (WiFi) standard. In some applications, a user would like to access these heterogenous systems (e.g., BT system and WiFi system) simultaneously, which unfortunately causes inter-radio interference. This is because operation channels of different wireless communication systems are close to one another, and the coexistence of different types of radio transceivers will result in undesired interference. For example, the in-device coexistence interference problem causes receiver performance degradation.

SUMMARY

One of the objectives of the claimed invention is to provide a method and apparatus for improving wireless communication performance under coexistence of multiple wireless communication systems in a same electronic device.

According to a first aspect of the present invention, an exemplary wireless communication method is disclosed. The exemplary wireless communication method includes: obtaining operational information of a first wireless communication system; in response to the operational information of the first wireless communication system, adjusting a wireless communication configuration of a second wireless communication system to set an adjusted wireless communication configuration for the second wireless communication system; and performing, by the second wireless communication system, wireless communication under the adjusted wireless communication configuration. The first wireless communication system and the second wireless communication system co-exist in a same electronic device.

According to a second aspect of the present invention, an exemplary electronic device is disclosed. The exemplary electronic device includes a plurality of co-existing wireless communication systems and a central control circuit. The co-existing wireless communication systems include a first wireless communication system and a second wireless communication system. The central control circuit is coupled to the first wireless communication system and the second wireless communication system. The central control circuit is arranged to obtain operational information of the first wireless communication system; and in response to the operational information of the first wireless communication system, adjust a wireless communication configuration of the second wireless communication system to set an adjusted wireless communication configuration for the second wireless communication system, such that the second wireless communication system performs wireless communication under the adjusted wireless communication configuration.

According to a third aspect of the present invention, an exemplary electronic device is disclosed. The exemplary electronic device has a plurality of co-existing wireless communication systems, including a first wireless communication system and a second wireless communication system. The second wireless communication system is arranged to obtain operational information of the first wireless communication system; in response to the operational information of the first wireless communication system, adjust a wireless communication configuration of the second wireless communication system to set an adjusted wireless communication configuration; and perform wireless communication under the adjusted wireless communication configuration.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
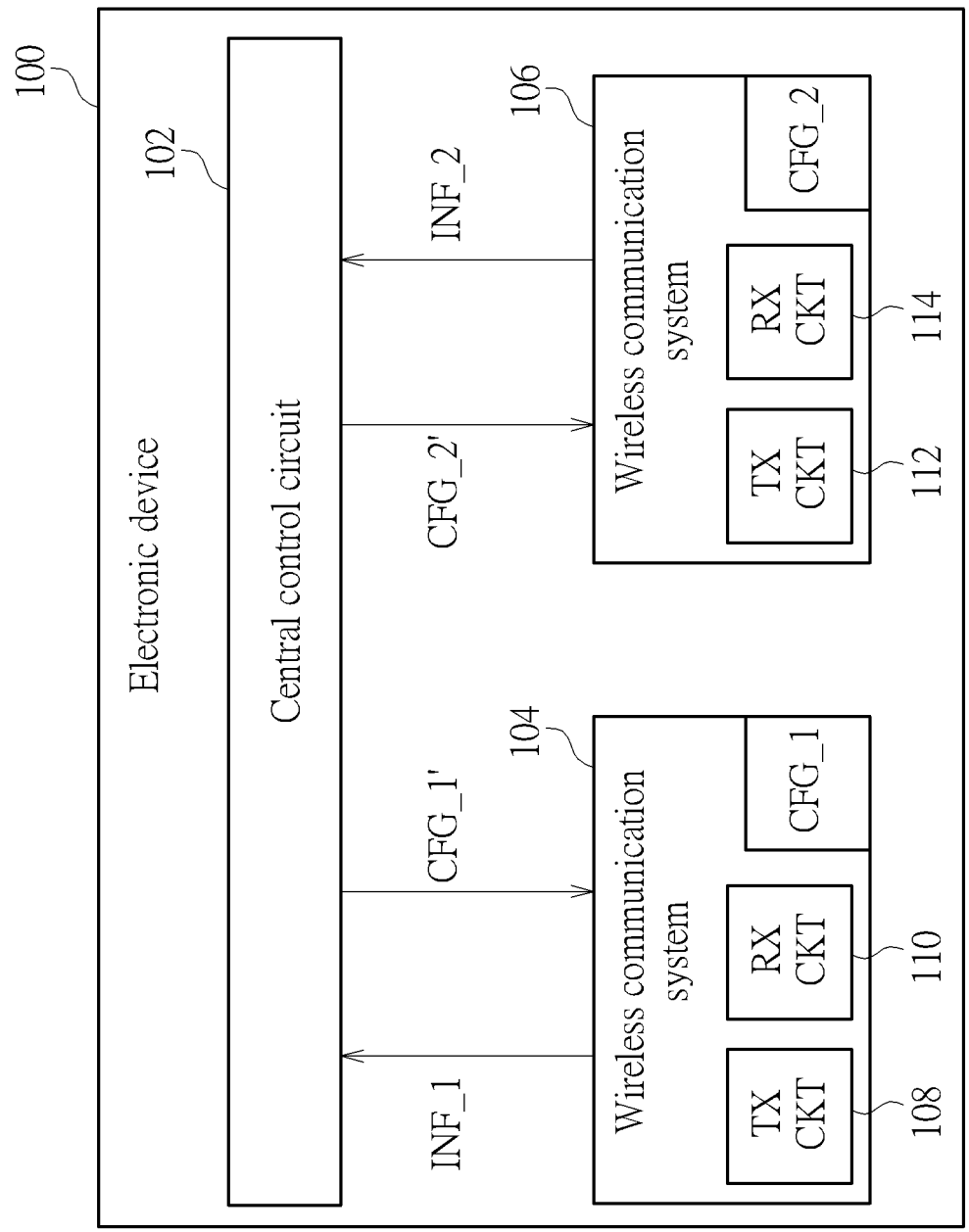
FIG. 1 is a diagram illustrating an electronic device according to an embodiment of the present invention.

FIG. 1 is a diagram illustrating an electronic device according to an embodiment of the present invention. By way of example, but not limitation, the electronic device 100 may be a portable device such as a cellular phone, a wearable device, or a tablet. As shown in FIG. 1, the electronic device 100 includes a central control circuit 102 and a plurality of co-existing wireless communication systems (e.g., wireless communication systems 104 and 106). For clarity and simplicity, only two wireless communication systems 104 and 106 are shown co-existing in the same electronic device 100. In practice, the electronic device 100 can be designed to have more than two co-existing wireless communication systems. Furthermore, the electronic device 100 may include additional circuit blocks (not shown) for achieving other designated functions.

The central control circuit 102 is coupled to the wireless communication systems 104 and 106. In this embodiment, one of the wireless communication systems 104 and 106 may be a Bluetooth (BT) system, and another of the wireless communication systems 104 and 106 may be a wireless fidelity (WiFi) system. However, this is for illustrative purposes only, and is not meant to be a limitation of the present invention. In practice, any multi-system coexistence design using one or more of the proposed techniques to improve the overall system performance falls within the scope of the present invention.

Each of the wireless communication systems 104 and 106 may include a transceiver consisting of a transmit (TX) circuit (denoted by "TX CKT") 108/112 and a receive (RX) circuit (denoted by "RX CKT") 110/114. When the wireless communication system 202/204 is operated under a TX mode, the TX circuit 108/112 is active, and the RX circuit 110/114 can be disabled for saving power. When the wireless communication system 202/204 is operated under an RX mode, the RX circuit 110/114 is active, and the TX circuit 108/112 can be disabled for saving power.

In a first scenario of the electronic device 100, the central control circuit 102 obtains operational information INF_1 of the wireless communication system 104, and adjusts a wireless communication configuration CFG 2 of the wireless communication system 106 in response to the operational information INF_1 of the wireless communication system 104, thereby setting an adjusted wireless communication configuration CFG_2' for the wireless communication system 106, such that the wireless communication system 106 performs wireless communication under the adjusted wireless communication configuration CFG_2'. In a second scenario of the electronic device 100, the central control circuit 102 obtains operational information INF_2 of the wireless communication system 106, and adjusts a wireless communication configuration CFG_1 of the wireless communication system 104 in response to the operational information INF_2 of the wireless communication system 106, thereby setting an adjusted wireless communication configuration CFG_1' for the wireless communication system 104, such that the wireless communication system 104 performs wireless communication under the adjusted wireless communication configuration CFG_1'. Further details of the proposed control scheme employed by any scenario are described later.

Figure 2:
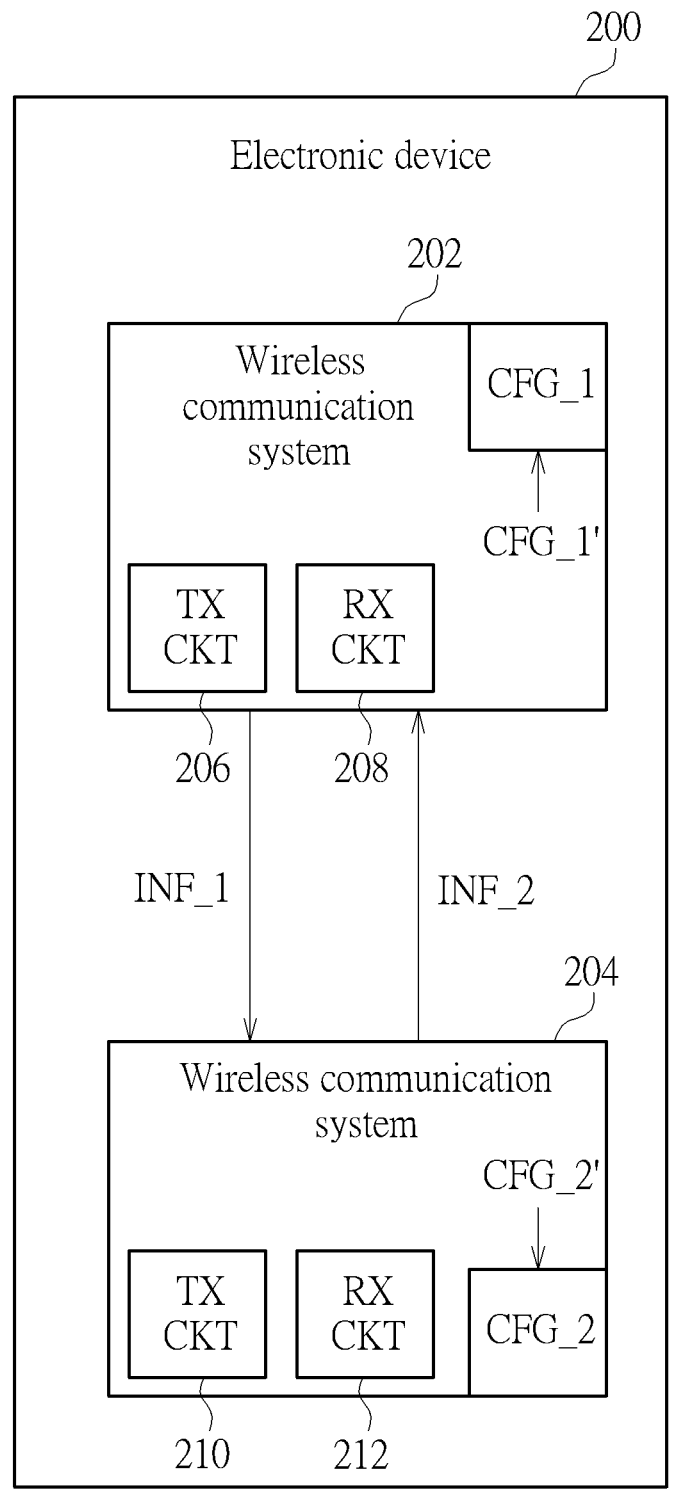
FIG. 2 is a diagram illustrating another electronic device according to an embodiment of the present invention.

FIG. 2 is a diagram illustrating another electronic device according to an embodiment of the present invention. By way of example, but not limitation, the electronic device 200 may be a portable device such as a cellular phone, a wearable device, or a tablet. As shown in FIG. 2, the electronic device 200 includes a plurality of co-existing wireless communication systems (e.g., wireless communication systems 202 and 204). For clarity and simplicity, only two wireless communication systems 202 and 204 are shown co-existing in the same electronic device 200. In practice, the electronic device 200 can be designed to have more than two co-existing wireless communication systems. Furthermore, the electronic device 200 may include additional circuit blocks (not shown) for achieving other designated functions.

In the electronic device 200, the wireless communication system 202 is coupled to the wireless communication system 204, such that information exchange is available between wireless communication systems 202 and 204. In this embodiment, one of the wireless communication systems 202 and 204 may be a Bluetooth (BT) system, and another of the wireless communication systems 202 and 204 may be a wireless fidelity (WiFi) system. However, this is for illustrative purposes only, and is not meant to be a limitation of the present invention. In practice, any multi-system coexistence design using one or more of the proposed techniques to improve the overall system performance falls within the scope of the present invention.

Each of the wireless communication systems 202 and 204 may include a transceiver consisting of a TX circuit (denoted by "TX CKT") 206/210 and an RX circuit (denoted by "RX CKT") 208/212. When the wireless communication system 202/204 is operated under a TX mode, the TX circuit 206/210 is active, and the RX circuit 208/212 can be disabled for saving power. When the wireless communication system 202/204 is operated under an RX mode, the RX circuit 208/212 is active, and the TX circuit 206/210 can be disabled for saving power.

In a first scenario of the electronic device 200, the wireless communication system 204 obtains operational information INF_1 of the wireless communication system 202, adjusts a wireless communication configuration CFG_2 of the wireless communication system 204 in response to the operational information INF_1 of the wireless communication system 202, thereby setting an adjusted wireless communication configuration CFG_2', and performs wireless communication under the adjusted wireless communication configuration CFG_2'. In a second scenario of the electronic device 200, the wireless communication system 202 obtains operational information INF_2 of the wireless communication system 204, adjusts a wireless communication configuration CFG_1 of the wireless communication system 202 in response to the operational information INF_2 of the wireless communication system 204, thereby setting an adjusted wireless communication configuration CFG_1', and performs wireless communication under the adjusted wireless communication configuration CFG_1'. Further details of the proposed control scheme employed by any scenario are described later.

For better understanding of technical features of the proposed control scheme, the following assumes that the wireless communication system 104/202 is a BT system and the wireless communication system 106/204 is a WiFi system, where the WiFi system may comply with an 802.11ax (WiFi 6) standard and may employ an orthogonal frequency division multiple access (OFDMA) technique for WiFi communication.

Figure 3:
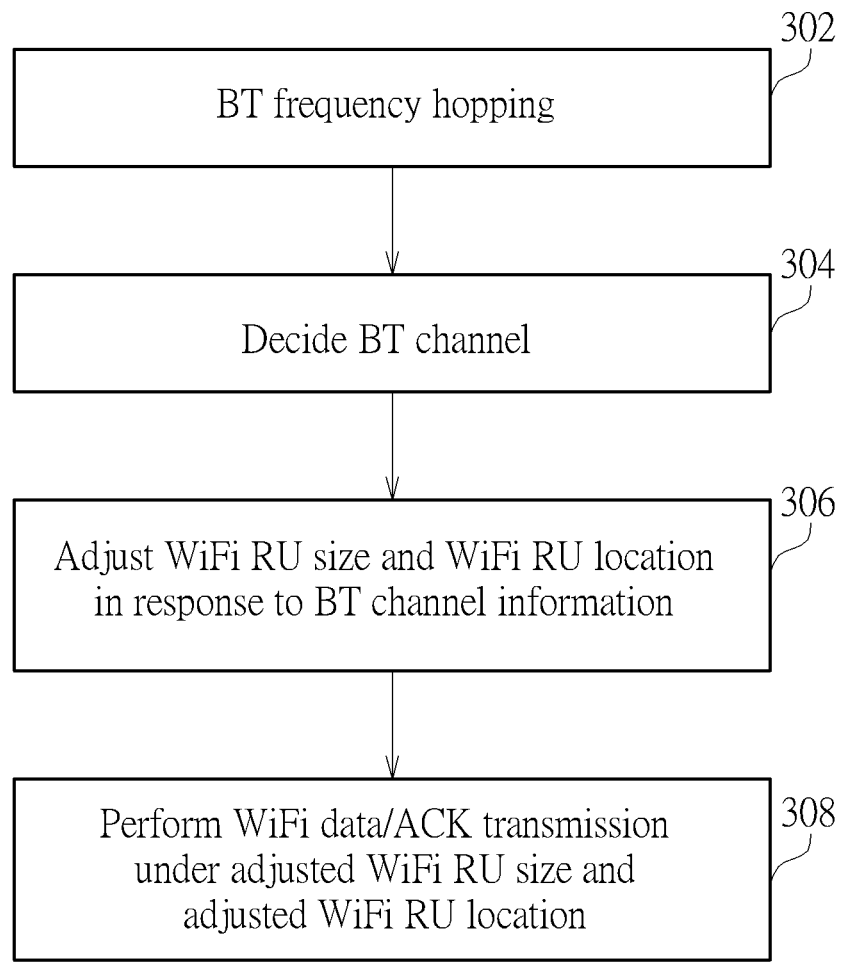
FIG. 3 is a flowchart illustrating a first control scheme according to an embodiment of the present invention.

FIG. 3 is a flowchart illustrating a first control scheme according to an embodiment of the present invention. The first control scheme may be employed by any of the electronic devices 100 and 200. At step 302, the wireless communication system 104 (or wireless communication system 202) performs frequency hopping for BT communication. At step 304, the operational information INF_1 of the wireless communication system 104 (or wireless communication system 202) is provided to the central control circuit 102 (or wireless communication system 204), where the operational information INF_1 includes channel location information of frequency hopping used by BT communication at the wireless communication system 104 (or wireless communication system 202). At step 306, the central control circuit 102 (or wireless communication system 204) determines the adjusted wireless communication configuration CFG_2' by adjusting the wireless communication configuration CFG_2 (which may be currently used by the wireless communication system 106 (or wireless communication system 204)) according to the operational information INF_1, where the wireless communication configuration CFG_2 includes an RU size and an RU location. At step 308, the wireless communication system 106 (or wireless communication system 204) performs wireless communication (e.g., WiFi transmission) under the adjusted wireless communication configuration CFG_2' including an adjusted RU size and an adjusted RU location. In a first case, the wireless communication performed under the adjusted wireless communication configuration CFG_2' is for WiFi data transmission. In a second case, the wireless communication performed under the adjusted wireless communication configuration CFG_2' is for WiFi acknowledgement (ACK) transmission.

In this embodiment, the RU size and the RU location used by OFDMA for WiFi transmission at the wireless communication system 106 (or wireless communication system 204) can be properly chosen to ensure that WiFi transmission is far distant away from the BT communication (steps 304 and 306). In this way, the WiFi transmission and the BT communication can get better system performance under the proposed control scheme. For example, when the WiFi channel is $\Delta Hz$ away from the BT channel, both of WiFi transmission and BT communication can get better performance. Assume that $\Delta Hz$ is 25 MHz. When the BT center is at 2412 Mhz and the WiFi center is at 2432 MHz, WiFi data and WiFi ACK can use RU106 (i.e., 106-subcarrierRU) centered at 2437 MHz to get better system performance.

Figure 4:
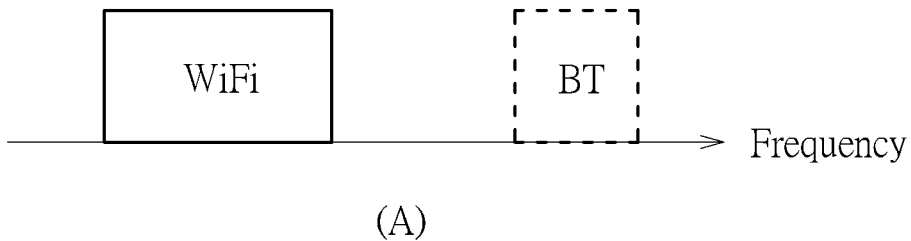
FIG. 4 is a diagram illustrating different RU settings employed by WiFi transmission under different BT conditions according to an embodiment of the present invention.
Figure 4:
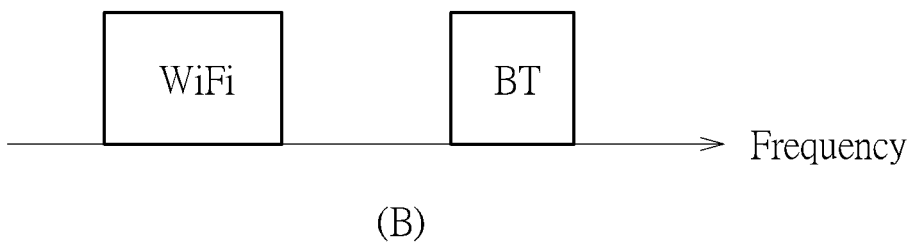
Figure 4:
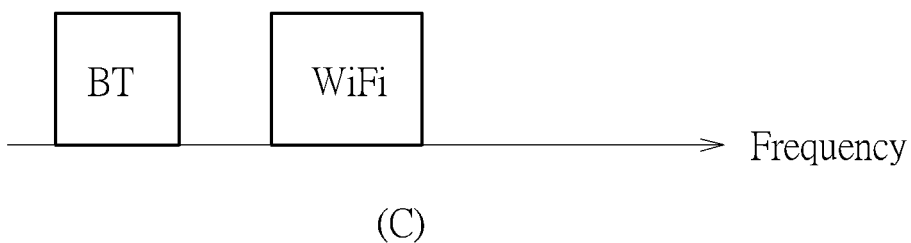

FIG. 4 is a diagram illustrating different RU settings employed by WiFi transmission under different BT conditions according to an embodiment of the present invention. The sub-diagram (A) in FIG. 4 shows a case where WiFi transmission is in operation at the absence of BT communication. The sub-diagram (B) in FIG. 4 shows a case where WiFi transmission and BT communication are both in operation. Compared to the WiFi transmission illustrated in sub-diagram (A), the WiFi transmission illustrated in sub-diagram (B) employs a different RU location and a smaller RU size under the control of the proposed control scheme. The sub-diagram (C) in FIG. 4 shows another case where WiFi transmission and BT communication are both in operation. Compared to the BT communication illustrated in sub-diagram (B), the BT communication illustrated in sub-diagram (C) has a different center frequency. Compared to the WiFi transmission illustrated in sub-diagram (B), the WiFi transmission illustrated in sub-diagram (C) employs a different RU location and a smaller RU size under the control of the proposed control scheme. It should be noted that these spectra shown in FIG. 4 are for illustrative purposes only, and are not meant to be limitations of the present invention.

Figure 5:
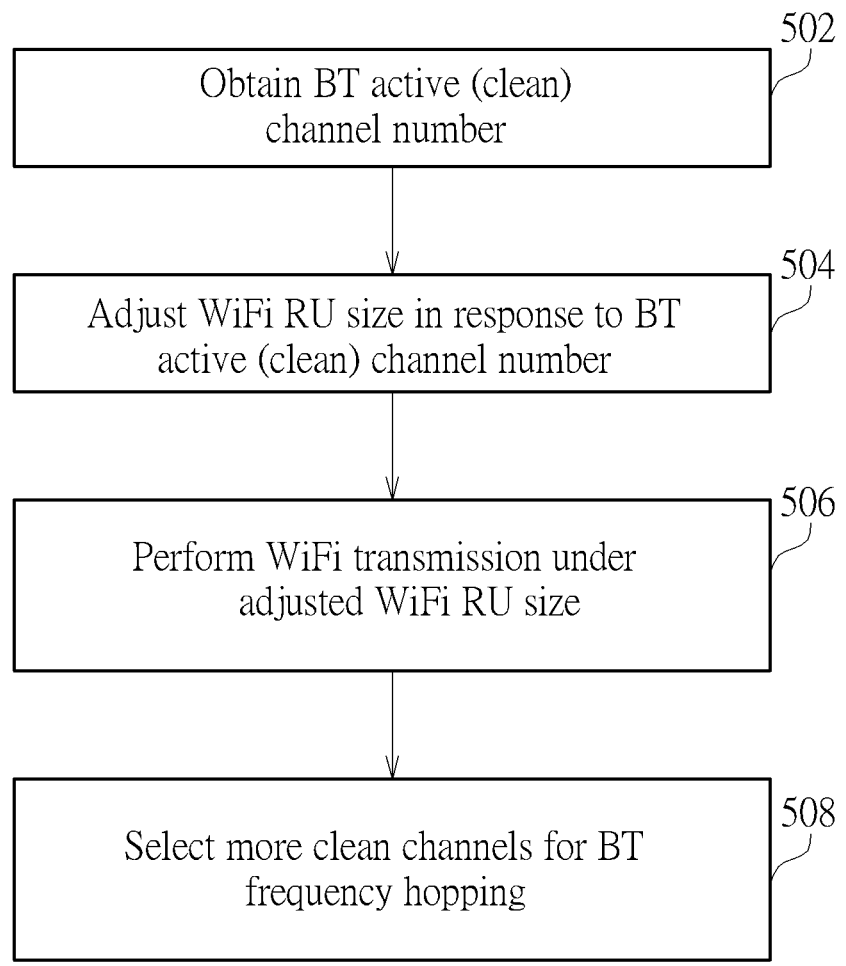
FIG. 5 is a flowchart illustrating a second control scheme according to an embodiment of the present invention.

FIG. 5 is a flowchart illustrating a second control scheme according to an embodiment of the present invention. The second control scheme may be employed by any of the electronic devices 100 and 200. At step 502, the operational information INF_1 of the wireless communication system 104 (or wireless communication system 202) is provided to the central control circuit 102 (or wireless communication system 204), where the operational information INF_1 includes an active (clean) channel number that is indicative of a number of active (clean) channels used by frequency hopping in BT communication at the wireless communication system 104 (or wireless communication system 202). At step 504, the central control circuit 102 (or wireless communication system 204) determines the adjusted wireless communication configuration CFG_2' by adjusting the wireless communication configuration CFG_2 (which may be currently used by the wireless communication device 106 (or wireless communication device 204)) according to the operational information INF_1, where the wireless communication configuration CFG_2 includes an RU size. At step 506, the wireless communication system 106 (or wireless communication system 204) performs wireless communication (e.g., WiFi transmission) under the adjusted wireless communication configuration CFG_2' including an adjusted RU size. At step 508, the wireless communication system 104 (or wireless communication system 202) can use enough active (clean) channels for frequency hopping in BT communication.

In this embodiment, when the active (clean) channel number is smaller than a pre-defined value specified by a BT standard, a smaller RU size is chosen by OFDMA for WiFi transmission at the wireless communication system 106 (or wireless communication system 204) to decrease the interference, thereby allowing BT communication to get enough active (clean) channels for achieving better performance. Assume that the BT standard defines that the minimum active (clean) channel number is 20. When only 15 channels are clean for BT communication, that is, the active (clean) channel number indicated by the operational information INF_1 is 15, the WiFi transmission can use RU106 (i.e., 106-subcarrier RU) to let BT communication get 10 more active (clean) channels for frequency hopping.

Figure 6:
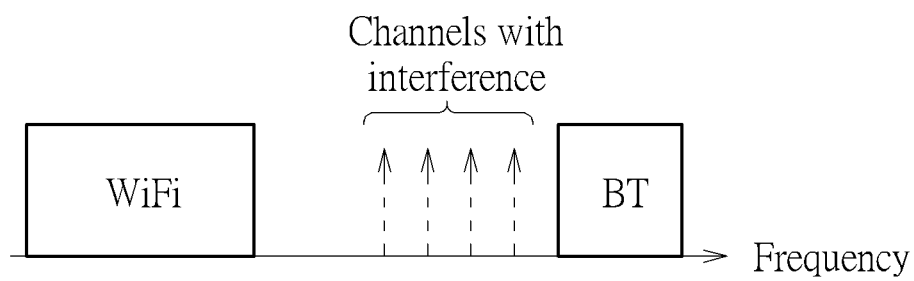
FIG. 6 is a diagram illustrating different BT active channel conditions under different RU settings employed by WiFi transmission according to an embodiment of the present invention.
Figure 6:
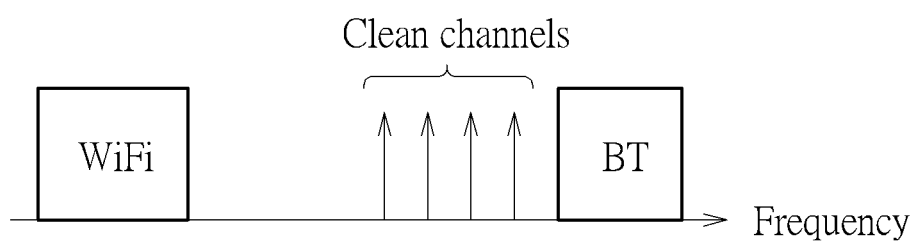

FIG. 6 is a diagram illustrating different BT active channel conditions under different RU settings employed by WiFi transmission according to an embodiment of the present invention. The sub-diagram (A) in FIG. 6 shows a case where some channels are interfered with the WiFi transmission using a larger RU size for OFDMA, such that the number of active (clean) channels that can be used by frequency hopping in BT communication is smaller than the minimum active (clean) channel number specified in the BT standard. The sub-diagram (B) in FIG. 6 shows a case where the WiFi transmission is instructed by the proposed control scheme to employ a smaller RU size to decrease the interference, thereby allowing the BT communication to get more clean channels for frequency hopping.

Figure 7:
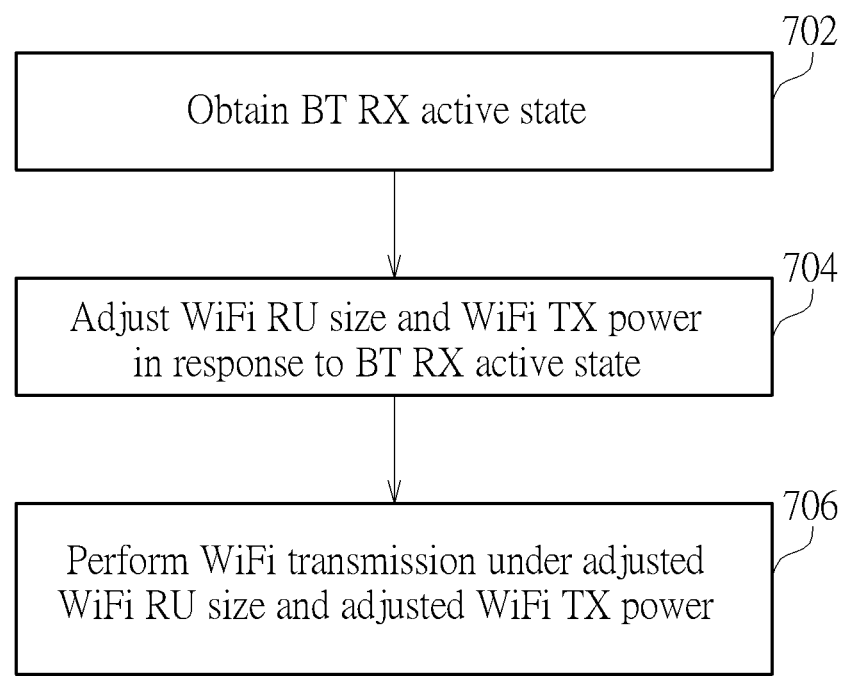
FIG. 7 is a flowchart illustrating a third control scheme according to an embodiment of the present invention.

FIG. 7 is a flowchart illustrating a third control scheme according to an embodiment of the present invention. The third control scheme may be employed by any of the electronic devices 100 and 200. At step 702, the operational information INF_1 of the wireless communication system 104 (or wireless communication system 202) is provided to the central control circuit 102 (or wireless communication system 204), where the operational information INF_1 includes RX active information that notifies an active state of the RX circuit 110 included in the wireless communication system 104 (or the RX circuit 208 included in the wireless communication system 202). At step 704, the central control circuit 102 (or wireless communication system 204) determines the adjusted wireless communication configuration CFG_2' by adjusting the wireless communication configuration CFG_2 (which may be currently used by the wireless communication system 106 (or wireless communication system 204)) according to the operational information INF_1, where the wireless communication configuration CFG_2 includes an RU size and a TX power value. At step 706, the wireless communication system 106 (or wireless communication system 204) performs wireless communication (e.g., WiFi transmission) under the adjusted wireless communication configuration CFG_2' including an adjusted RU size and an adjusted TX power value.

For example, the wireless communication system 106 (or wireless communication system 204) employs an RU size S1 and a TX power value P1 for WiFi transmission when there is no BT communication in the air (i.e., wireless communication system 104 (or wireless communication system 202) is inactive). When the RX circuit 110 of the wireless communication system 104 (or RX circuit 208 of wireless communication system 202) is active for receiving packets, the wireless communication system 106 (or wireless communication system 204) is instructed by the proposed control scheme to employ a smaller RU size S2 (S2<S1) and a lower TX power value P2 (P2<P1) for protecting the BT RX performance while keeping the same WiFi TX packet error rate (PER).

Figure 8:
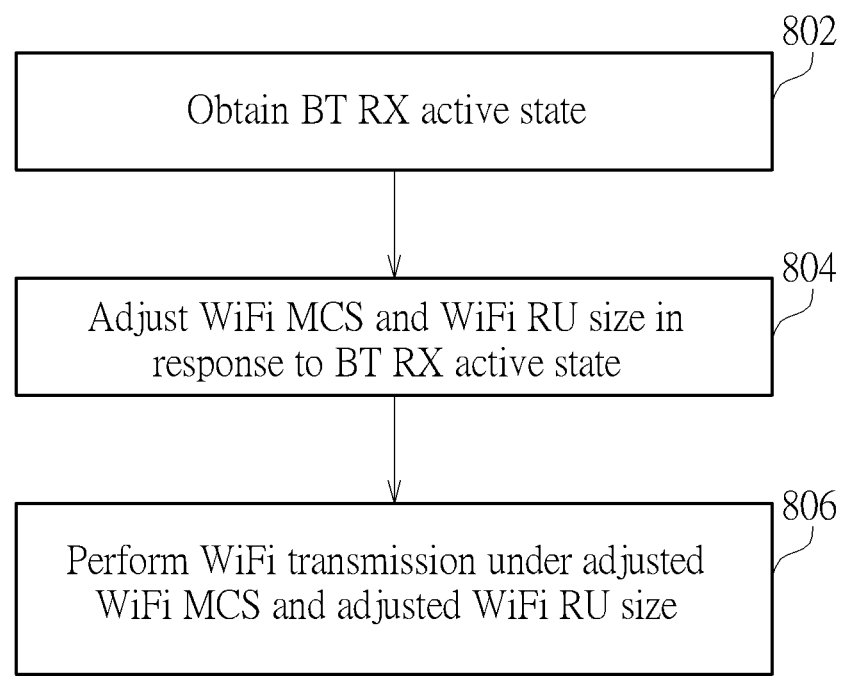
FIG. 8 is a flowchart illustrating a fourth control scheme according to an embodiment of the present invention.

FIG. 8 is a flowchart illustrating a fourth control scheme according to an embodiment of the present invention. The fourth control scheme may be employed by any of the electronic devices 100 and 200. At step 802, the operational information INF_1 of the wireless communication system 104 (or wireless communication system 202) is provided to the central control circuit 102 (or wireless communication system 204), where the operational information INF_1 includes RX active information that notifies an active state of the RX circuit 110 included in the wireless communication system 104 (or RX circuit 208 included in the wireless communication system. 202). At step 804, the central control circuit 102 (or wireless communication system 204) determines the adjusted wireless communication configuration CFG_2' by adjusting the wireless communication configuration CFG_2 according to the operational information INF_1, where the wireless communication configuration CFG_2 includes a modulation and coding scheme (MCS) and an RU size. At step 806, the wireless communication system 106 (or wireless communication system 204) performs wireless communication (e.g., WiFi transmission) under the adjusted wireless communication configuration CFG_2' including an adjusted MCS and an adjusted RU size.

For example, the wireless communication system 106 (or wireless communication system 204) employs an RU size S1 and a modulation and coding scheme MCS_1 for WiFi transmission when there is no BT communication in the air (i.e., wireless communication system 104 (or wireless communication system 202) is inactive). When the RX circuit 110 of the wireless communication system 104 (or RX circuit 208 of the wireless communication system 202) is active for receiving packets, the wireless communication system 106 (or wireless communication system 204) is instructed by the proposed control scheme to employ a different RU size S2 (S2≠S1) and a different modulation and coding scheme MCS_2 (MCS_2≠MCS_1) for protecting the BT RX performance while keeping the same WiFi throughput. That is, a proper combination of an RU size and a modulation and coding scheme is selected at step 804 to protect the BT RX performance without degrading the WiFi TX throughput. For example, the adjusted wireless communication configuration CFG_2' may have a smaller RU size (e.g., S2=RU106) accompanied with a better MCS selection (e.g., MCS_2=MCS7 that is different from MCS_1=MCS11).

Figure 9:
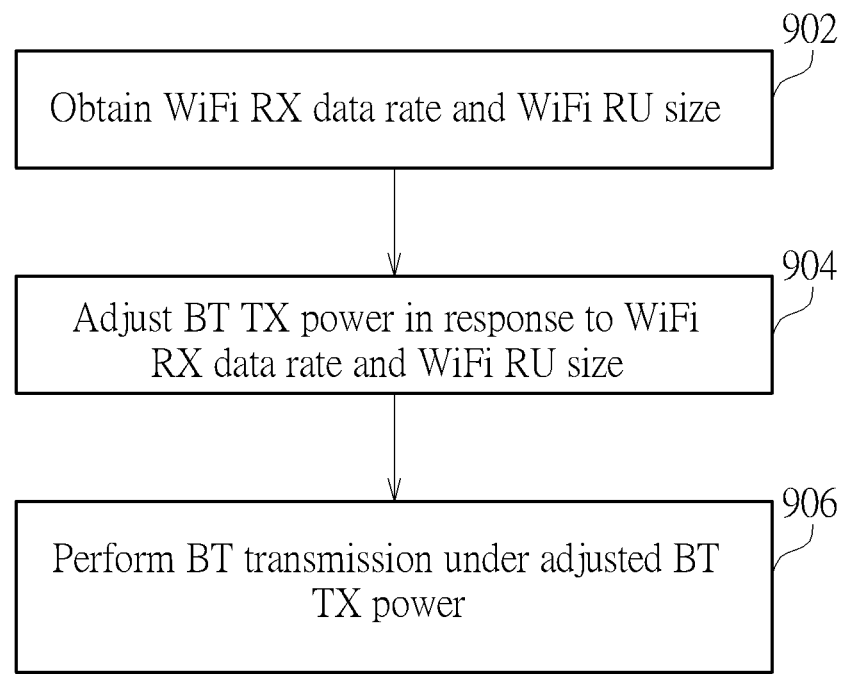
FIG. 9 is a flowchart illustrating a fifth control scheme according to an embodiment of the present invention.

FIG. 9 is a flowchart illustrating a fifth control scheme according to an embodiment of the present invention. The fifth control scheme may be employed by any of the electronic devices 100 and 200. At step 902, the operational information INF_2 of the wireless communication system 106 (or wireless communication system 204) is provided to the central control circuit 102 (or wireless communication system 202), where the operational information INF_2 includes an RX data rate and an RU size. At step 904, the central control circuit 102 (or wireless communication system 202) determines the adjusted wireless communication configuration CFG_1' by adjusting the wireless communication configuration CFG_1 (which may be currently used by the wireless communication system 104 (or wireless communication system 202)) according to the operational information INF_2, where the wireless communication configuration CFG_1 includes a TX power value. At step 906, the wireless communication system 104 (or wireless communication system 202) performs wireless communication (e.g., BT transmission) under the adjusted wireless communication configuration CFG_1' including an adjusted TX power value.

Different modulation and coding schemes are defined by different combinations of data modulation (e.g., BPSK, QPSK, 16QAM, 64QAM, 256QAM, or 1024QAM) and coding rate (e.g., 1/2, 2/3, 3/4, or 5/6), and correspond to different TX data rates. For example, when the wireless communication system 106 (or wireless communication system 204) receives MCS9 packets with RU242 (i.e., 242-subcarrier RU), the wireless communication system 104 (or wireless communication system 202) is instructed by the proposed control scheme to employ TX power of −10 dBm for BT transmission. For another example, when the wireless communication system 106 (or wireless communication system 204) receives MCS7 packets with RU242 (i.e., 242-subcarrier RU), the wireless communication system 104 (or wireless communication system 202) is instructed by the proposed control scheme to employ TX power of −5 dBm for BT transmission with a better range.

For yet another example, when the wireless communication system 106 (or wireless communication system 204) receives MCS7 packets with RU106 (i.e., 106-subcarrier RU), the wireless communication system 104 (or wireless communication system 202) is instructed by the proposed control scheme to employ TX power of −1 dBm for BT transmission with a much better range. To put it simply, the BT TX power can be optimized on the basis of the WiFi RX information. In this way, the BT transmission can protect the WiFi RX performance while keeping the BT link quality.

Figure 10:
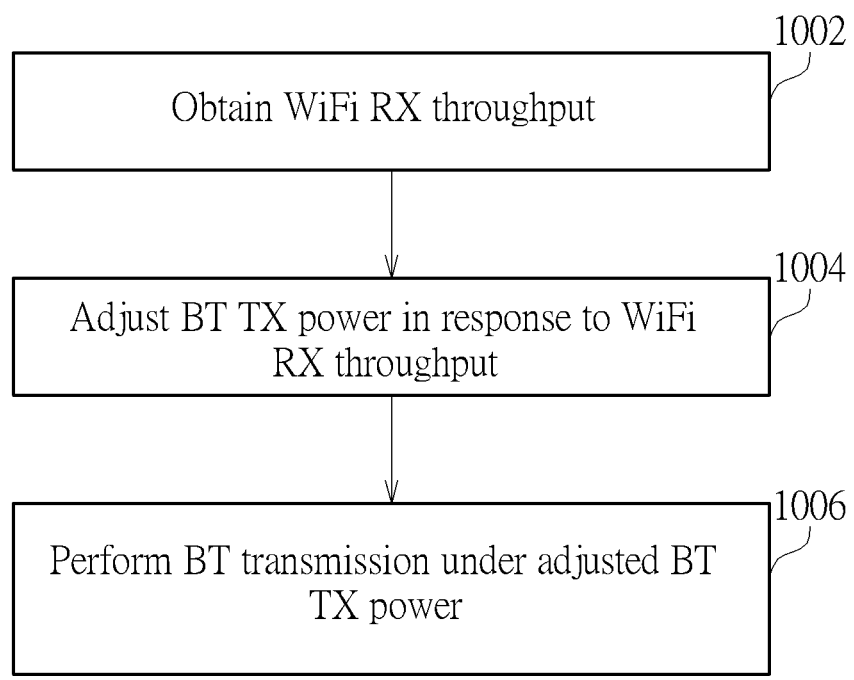
FIG. 10 is a flowchart illustrating a sixth control scheme according to an embodiment of the present invention.

FIG. 10 is a flowchart illustrating a sixth control scheme according to an embodiment of the present invention. The sixth control scheme may be employed by any of the electronic devices 100 and 200. At step 1002, the operational information INF_2 of the wireless communication system 106 (or wireless communication system 204) is provided to the central control circuit 102 (or wireless communication system 202), where the operational information INF_2 includes an RX throughput. At step 1004, the central control circuit 102 (or wireless communication system 202) determines the adjusted wireless communication configuration CFG_1' by adjusting the wireless communication configuration CFG_1 (which may be currently used by the wireless communication system 104 (or wireless communication system 202)) according to the operational information INF_2, where the wireless communication configuration CFG_1 includes a TX power value. At step 1006, the wireless communication system 104 (or wireless communication system 202) performs wireless communication (e.g., BT transmission) under the adjusted wireless communication configuration CFG_1' including an adjusted TX power value.

For example, when the WiFi RX throughput of the wireless communication system 106 (or wireless communication system 204) is 50 Mbps, the wireless communication system 104 (or wireless communication system 202) is instructed by the proposed control scheme to employ TX power of 5 dBm for BT transmission. For another example, when the WiFi RX throughput of the wireless communication system 106 (or wireless communication system 204) is 20 Mbps, the wireless communication system 104 (or wireless communication system 202) is instructed by the proposed control scheme to employ TX power of −1 dBm for BT transmission. For yet another example, when the WiFi RX throughput of the wireless communication system 106 (or wireless communication system 204) is 70 Mbps, the wireless communication system 104 (or wireless communication system 202) is instructed by the proposed control scheme to employ TX power of −10 dBm for BT transmission. To put it simply, the BT TX power can be optimized on the basis of the WiFi RX information. In this way, the BT transmission with proper TX power can protect the WiFi RX throughput performance.

Figure 11:
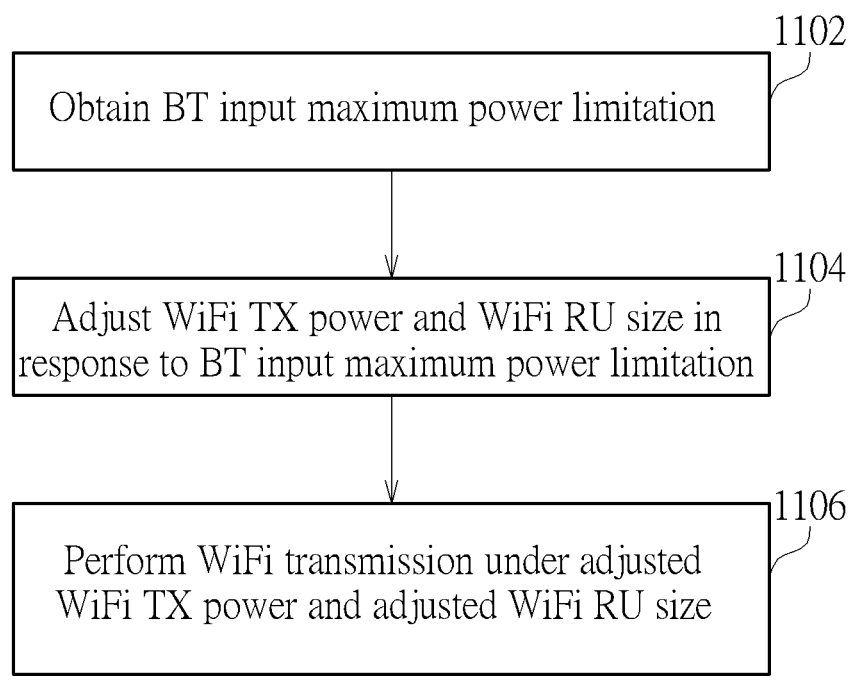
FIG. 11 is a flowchart illustrating a seventh control scheme according to an embodiment of the present invention.

FIG. 11 is a flowchart illustrating a seventh control scheme according to an embodiment of the present invention. The seventh control scheme may be employed by any of the electronic devices 100 and 200. At step 1102, the operational information INF_1 of the wireless communication system 104 (or wireless communication system 202) is provided to the central control circuit 102 (or wireless communication system 204), where the operational information INF_1 includes an input maximum power limitation. At step 1104, the central control circuit 102 (or wireless communication system 204) determines the adjusted wireless communication configuration CFG_2' (which may be a finalized configuration actually used by the wireless communication system 106 (or wireless communication system 204) after adjustment is made by the proposed control scheme) by adjusting the wireless communication configuration CFG_2 (which may be a preliminary configuration expected to be used by the wireless communication system 106 (or wireless communication system 204) before adjustment is made by the proposed control scheme) according to the operational information INF_1, where the wireless communication configuration CFG_2 includes a TX power value and an RU size. At step 1106, the wireless communication system 106 (or wireless communication system 204) performs wireless communication (e.g., WiFi transmission) under the adjusted wireless communication configuration CFG_2' including an adjusted TX power value and an adjusted RU size.

Regarding an electronic device with coexistence of multiple communication systems, when the TX power of WiFi transmission is too large, it will cause damage to other communication system(s). Assume X dBm input power of a BT system will cause damage to its RX circuit (e.g., RX circuit 110 of wireless communication system 104 or RX circuit 208 of wireless communication system 202). When a TX circuit of a WiFi system (e.g., TX circuit 112 of wireless communication system 106 or TX circuit 210 of wireless communication system 204) wants to employ TX power of Y dBm (Y>X) in the wireless communication configuration CFG_2, the WiFi system is instructed by the proposed control scheme to employ a smaller RU size and a smaller TX power (e.g., X dBm) for WiFi transmission, where a setting of the smaller RU size in the adjusted wireless communication configuration CFG_2' is based on a difference between X and Y. To put it simply, the wireless communication system 106 (or wireless communication system 204) can use a smaller RU size and a smaller TX power to prevent the wireless communication system 104 (or wireless communication system 202) from being damaged due to high WiFi TX power, while keeping the same WiFi TX performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method comprising:
obtaining operational information of a first wireless communication system;
in response to the operational information of the first wireless communication system, adjusting a wireless communication configuration of a second wireless communication system to set an adjusted wireless communication configuration for the second wireless communication system; and
performing, by the second wireless communication system, wireless communication under the adjusted wireless communication configuration;
wherein the first wireless communication system and the second wireless communication system co-exist in a same electronic device; and
wherein the first wireless communication system and the second wireless communication system are different wireless communication systems that comply with different wireless technology standards; and
wherein one of the operational information obtained from the first wireless communication system and the wireless communication configuration of the second wireless communication system that is adjusted based on the operational information comprises a resource unit (RU) setting for orthogonal frequency division multiple access (OFDMA), and another of the operational information obtained from the first wireless communication system and the wireless communication configuration of the second wireless communication system that is adjusted based on the operational information has no RU setting for OFDMA, or wherein the operational information obtained from the first wireless communication system for adjusting the wireless communication configuration of the second wireless communication system comprises a receive (RX) throughput.

2. The wireless communication method of claim 1, wherein said one of the first wireless communication system and the second wireless communication system employs an OFDMA technique; and said one of the operational information and the wireless communication configuration comprises the RU setting for OFDMA.

3. The wireless communication method of claim 2, wherein the operational information comprises channel location information, and the wireless communication configuration comprises an RU size and an RU location.

4. The wireless communication method of claim 3, wherein the wireless communication performed by the second wireless communication system under the adjusted wireless communication configuration is for data transmission.

5. The wireless communication method of claim 3, wherein the wireless communication performed by the second wireless communication system under the adjusted wireless communication configuration is for acknowledgement (ACK) transmission.

6. The wireless communication method of claim 2, wherein the operational information comprises an active channel number that is indicative of a number of active channels used by the first wireless communication system for frequency hopping, and the wireless communication configuration comprises an RU size.

7. The wireless communication method of claim 6, wherein the active channel number is smaller than a predefined value specified by a wireless communication standard.

8. The wireless communication method of claim 2, wherein the operational information comprises receive (RX) active information that notifies an active state of an RX circuit included in the first wireless communication system, and the wireless communication configuration comprises an RU size and a transmit (TX) power value.

9. The wireless communication method of claim 2, wherein the operational information comprises receive (RX) active information that notifies an active state of an RX circuit included in the first wireless communication system, and the wireless communication configuration comprises a modulation and coding scheme (MCS) and an RU size.

10. The wireless communication method of claim 2, wherein the operational information comprises a receive (RX) data rate and an RU size, and the wireless communication configuration comprises a transmit (TX) power value.

11. The wireless communication method of claim 2, wherein the operational information comprises an input maximum power limitation, and the wireless communication configuration comprises a transmit (TX) power value and an RU size.

12. The wireless communication method of claim 11, wherein an RU size included in the adjusted wireless communication configuration depends on a difference between the input maximum power limitation and the TX power value.

13. The wireless communication method of claim 1, wherein the operational information comprises the RX throughput, and the wireless communication configuration comprises a transmit (TX) power value.

14. The wireless communication method of claim 1, wherein one of the first wireless communication system and the second wireless communication system is a Bluetooth (BT) system, and another of the first wireless communication system and the second wireless communication system is a wireless fidelity (WiFi) system.

15. An electronic device comprising:
a plurality of co-existing wireless communication systems, comprising:
  a first wireless communication system; and
  a second wireless communication system; and
a central control circuit, coupled to the first wireless communication system and the second wireless communication system, wherein the central control circuit is arranged to:
  obtain operational information of the first wireless communication system; and
  in response to the operational information of the first wireless communication system, adjust a wireless communication configuration of the second wireless communication system to set an adjusted wireless communication configuration for the second wireless communication system, such that the second wireless communication system performs wireless communication under the adjusted wireless communication configuration;
wherein the first wireless communication system and the second wireless communication system are different wireless communication systems that comply with different wireless technology standards; and
wherein one of the operational information obtained from the first wireless communication system and the wireless communication configuration of the second wireless communication system that is adjusted based on the operational information comprises a resource unit (RU) setting for orthogonal frequency division multiple access (OFDMA), and another of the operational information obtained from the first wireless communication system and the wireless communication configuration of the second wireless communication system that is adjusted based on the operational information has no RU setting for OFDMA, or wherein the operational information obtained from the first wireless communication system for adjusting the wireless communication configuration of the second wireless communication system comprises a receive (RX) throughput.

16. The electronic device of claim 15, wherein one of the first wireless communication system and the second wireless communication system is a Bluetooth (BT) system, and another of the first wireless communication system and the second wireless communication system is a wireless fidelity (WiFi) system.

17. An electronic device comprising:
a plurality of co-existing wireless communication systems, comprising:
  a first wireless communication system; and
  a second wireless communication system, arranged to:
    obtain operational information of the first wireless communication system;
    in response to the operational information of the first wireless communication system, adjust a wireless communication configuration of the second wireless communication system to set an adjusted wireless communication configuration; and
    perform wireless communication under the adjusted wireless communication configuration;
wherein the first wireless communication system and the second wireless communication system are different wireless communication systems that comply with different wireless technology standards; and
wherein one of the operational information obtained from the first wireless communication system and the wireless communication configuration of the second wireless communication system that is adjusted based on the operational information comprises a resource unit (RU) setting for orthogonal frequency division multiple access (OFDMA), and another of the operational information obtained from the first wireless communication system and the wireless communication configuration of the second wireless communication system that is adjusted based on the operational information has no RU setting for OFDMA, or wherein the operational information obtained from the first wireless communication system for adjusting the wireless communication configuration of the second wireless communication system comprises a receive (RX) throughput.

18. The electronic device of claim 17, wherein one of the first wireless communication system and the second wireless communication system is a Bluetooth (BT) system, and another of the first wireless communication system and the second wireless communication system is a wireless fidelity (WiFi) system.

\* \* \* \* \*